Figure 6:
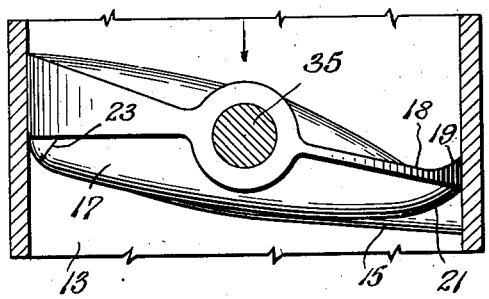

Edward Dodson Inventor

Patented Jan. 27, 1942

2,271,390

UNITED STATES PATENT OFFICE 2,271,390

THROTTLE VALVE FOR CARBURETORS AND OTHER CONDUITS

Edward Dodson, Putney Heath, London, England
Application May 8, 1940, Serial No. 334,077
In Great Britain May 19, 1939

12 Claims. (Cl. 251—11)

This invention relates to throttle valves for carburetors but it may also be applied to such valves used in other conduits for controlling the flow of air or other fluid therethrough.

The usual butterfly throttle valve for aero engine carburetors consists of a plate or disc of approximately elliptical cross section arranged to extend obliquely across the induction pipe or other conduit to close it, said disc being turned in opening about an axis extending diametrically through said conduit. The face of the disc against which the stream impinges will be hereinafter referred to as the upstream face, and the other face of the disc will be hereinafter referred to as the downstream face. Moreover, one edge of the disc will meet the stream before the other, the first edge being hereinafter referred to as the leading edge and the second edge as the trailing edge. Such discs have hitherto been made to balance geometrically and therefore become unbalanced dynamically when the stream is flowing. Loads of the order of 48 inch pounds are experienced, in the case of aero engine carburetors, tending to keep such throttle valves closed and further the load in large aero engine carburetors is irregular and tends to attain maximum values in the neighborhood of twenty degrees of throttle opening.

Owing to this irregularity difficulty is experienced in accurately controlling the power of the engine through the necessarily light control mechanism extending between the pilot's lever and the throttle valve.

One of the objects of this invention is to shape the throttle valve so as to relieve the aerodynamic loading. Another object is to reduce the power increment per degree of opening of the throttle valve in the early stages of its movement from the closed position and thereby provide greater delicacy of control which is particularly desired in aircraft when taxi-ing or making an approach to a landing.

The throttle valve according to this invention is constituted by a disc shaped to reduce the aerodynamic loading on the valve by the provision of a bulge at the leading edge on the downstream side of the disc, or by the provision on the upstream side of the disc adjacent to its trailing edge of a concave depression. Preferably the throttle valve is formed both with the bulge adjacent to its leading edge and with the concave depresison adjacent to its trailing edge.

The effect of the bulge adjacent to the leading edge is to fill up a space where as a result of the stream, a local reduction in pressure and eddies tend to form, while the effect of the concave depression adjacent to the trailing edge is to divert the stream in such a way that the reaction caused by such diversion will tend to open the throttle valve. Each of these alterations contributes to the desired result and may be used separately but by using both of them the peak load may be reduced by nearly 80%, and also occurs at a considerably greater throttle opening, where delicacy of control is no longer so important.

Figure 7:
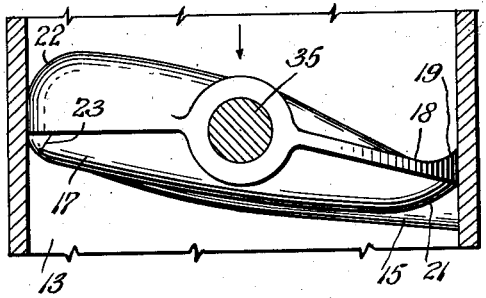
Figure 3:
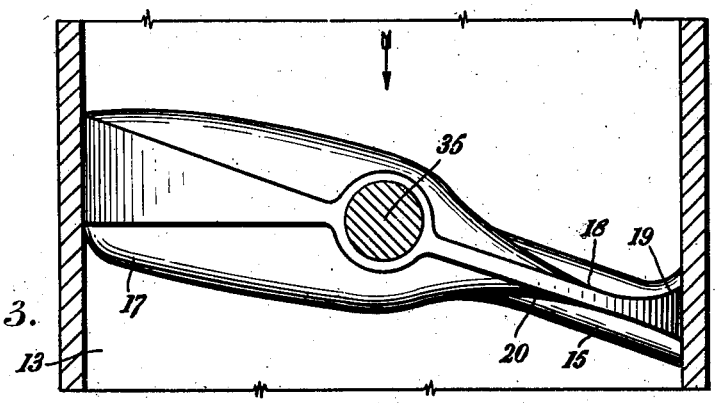
Figure 4:
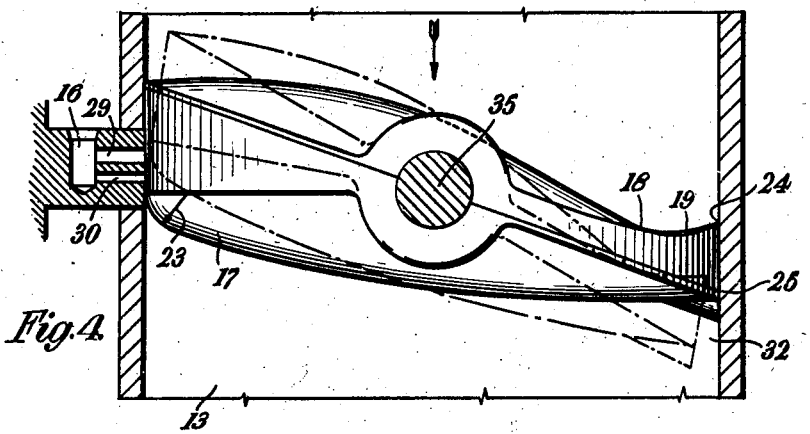
Figure 5:
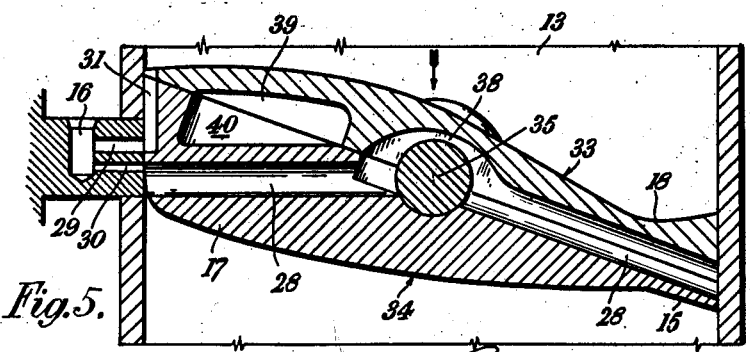

The invention will now be explained in greater detail with reference to the accompanying drawings, in which Figures 1 to 4 respectively are side elevations of four different forms of throttle valve constructed in accordance with the present invention the conduit and valve spindle being shown in section, Figure 5 is a vertical section through the throttle valve shown in Figure 4, Figures 6 and 7 are elevations of two further forms of the throttle valve according to the invention.

Figure 1:
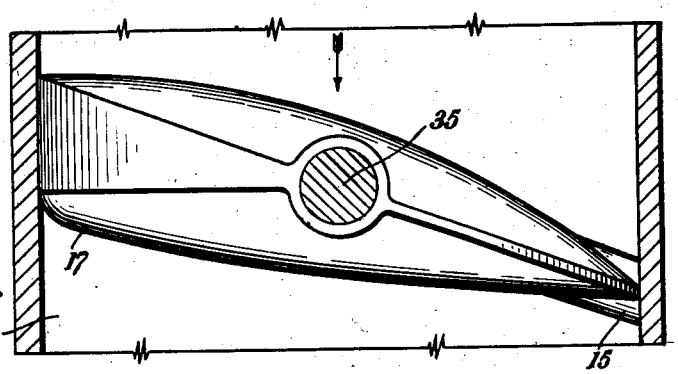

In all of the figures the air is assumed to flow from above in the direction of the arrow shown in Figure 1.

The known form of throttle valve, on which the valve according to the invention represents an improvement, is constituted by a disc of approximately elliptical cross-section arranged to lie obliquely across the induction pipe when in the closed position. The load curve representing the load required to open such a throttle valve in pounds plotted against throttle opening in degrees has a very marked peak at about twenty degrees throttle opening. One of the objects of the invention is to reduce the aerodynamic load on the throttle valve which tends to close it and also to render this load as uniform as possible throughout the range of throttle opening.

The throttle valve 15 shown in Figure 1 differs from the known form by the provision of a bulge 17 at the leading edge on the downstream side. This bulge fills up the space in which eddies form in the case of the known throttle valve. Although the load curve of the valve shown in Fig. 1 still exhibits a marked peak at about twenty degrees throttle opening, the load throughout the early stages of opening is very materially reduced as compared with the known throttle valve. It will be observed that, viewing the bulge in section and in the closed position of the valve as shown in Figure 1, the edge of the valve extends downstream from the point at which the leading edge of the disc meets the wall of the induction pipe 13 and contacts with the wall of the induction pipe to a point at which it turns inward, and merges with the downstream face of the disc. This point is, in this instance, level with the pivotal axis of the disc.

Figure 2:
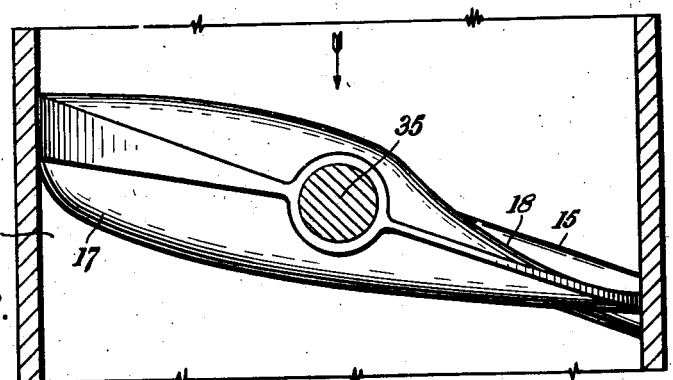

In Figure 2 is shown a form of throttle valve in which there is a bulge 17 at the leading edge of the downstream side which however is smaller than the corresponding bulge in the case of the throttle valve shown in Figure 1 and which does not completely fill the eddy area, the straight portion of the edge of the bulge terminating somewhat on the upstream side of the pivotal axis of the disc. In addition to being provided with the bulge 17, the throttle valve in Figure 2 has a concave depression 18 at its trailing edge on the upstream side. The effect of this is to divert the airflow and produce a reaction on the throttle valve tending to move it towards the open position. The load curve for this throttle valve is of similar form to that for the throttle valve according to Fig. 1 and shows a considerable improvement over the load curve for the known throttle valve.

In the case of the throttle valve shown in Figure 3 the bulge 17 is larger than that shown in Figure 2 and of about the same size as that shown in Figure 1, the straight portion of the edge of the bulge again terminating at a point level with the pivotal axis of the disc. The bulge consequently fills up the whole of the eddy space. In addition the extreme trailing edge of the disc on the upstream side, which constitutes the outer portion of the concave depression 18, is swept up as shown at 19 away from the central plane of the throttle and towards the stream. This represents a very considerable improvement from the point of view of reduction in aerodynamic loading over the throttle valves shown in Figures 1 and 2.

It will be observed that in the case of the valve shown in Figure 3 there is a concave depression 20 at the trailing edge on the downstream side. In the case of the valve shown in Figure 4 this depression is removed. The load curve for the throttle valve illustrated in Figure 4 is generally similar to that shown in Figure 3 but has improved characteristics at low throttle openings. A comparison of these two load curves indicates that the provision of a depression 20 on the downstream side of the trailing edge is without material effect.

The throttle valve shown in Figure 6 differs from that in Figure 4 in that the portion 21 at the trailing edge on the downstream side is curved to lie approximately parallel to the swept up portion 19 of the trailing edge on the upstream side. This gives a further improvement in the load curve.

The throttle valve shown in Figure 7 is similar to that shown in Figure 6 except that the leading edge is rounded off at 22 on the upstream side and this form of throttle valve proves to give the best results of all.

In addition to effecting a reduction in aerodynamic loading on the valve, the invention gives a further important advantage, namely, less rapid development of power per degree of throttle opening consequent upon the slower opening of the valve.

The effect of the changes of shape at the leading and trailing edges of the disc in the valve according to Fig. 4 as compared with the known valve is to produce a very much slower unmasking of the induction pipe as the valve is opened. This is due to the fact, firstly, that the straight portion of the edge of the bulge terminates at a point level with the pivotal axis of the disc, the nose portion of the bulge 17 being curved to a small radius 23 and, secondly, to the fact that the end 24 of the upswept trailing edge 19 lies considerably above the point 25 at which the central plane of the disc meets the wall of the induction pipe.

Although in the case of the valve shown in Figure 4 the areas of the induction pipe unmasked at the leading and trailing edges respectively of the valve are considerably smaller than the corresponding areas in the case of the known throttle valve, the area unmasked at the trailing edge is greater than that at the leading edge. This is an important advantage because it facilitates the transfer of fuel from the slow running jet 16 through the transverse passage 28 which is shown in Figure 5.

When the engine is idling substantially no fuel is picked up from the main jet, which is not shown but is to be understood as located above the throttle valve in each of the figures, owing to the small quantity of air which is being drawn through the induction pipe. Under these conditions the whole of the fuel supply is drawn from the slow running jet 16. This jet is provided with two fuel passages 29, 30 and in the early stages of throttle opening the fuel supply through the lower passage 30 is diluted with air drawn through the upper passage 29. In the case of the valve shown in Figures 4 and 5 a groove 31 is provided at the leading edge of the disc to give access for the passage of air through the fuel passage 29.

As however the valve gradually opens, it begins to choke the supply of air through the passage 29, as will be understood from a consideration of the position of the valve at ten degrees opening, as shown in chain-dotted lines in Figure 4. Under these conditions both passages 29, 30 deliver fuel from the slow running jet 16, this compensating for the decreased suction at the "flat spot" which occurs just before the main fuel supply comes into operation.

Owing to the increased area of unmasking at the trailing edge of the valve a greater quantity of fuel will be drawn through the transverse passage 28 and, as will be seen from the chain-dotted position of the valve in Figure 4, a Venturi shaped aperture 32 is opened at the trailing edge of the valve which produces a dynamic suction on the transverse passage and consequently facilitates the transfer of fuel therethrough.

Slow running jets are also provided in the case of the valves shown in the remaining figures, but they have been omitted from these figures, which are concerned only with the effect of changes in shape of the valve on the aerodynamic loading.

Due to the slower unmasking of the induction pipe according to the invention, the increment of power per degree of throttle opening is materially reduced during the early stages of opening with the result that greater delicacy of control is obtained.

As will be observed from Figures 4 and 5, it is convenient in the case of the valve according to the invention to build up the disc of separate upper and lower portions 33, 34 which are separately keyed to the valve spindle 35 and are united by screws (not shown). Figure 5 shows how the transverse passage is curved upwardly at 38 to pass over the spindle 35. It also illustrates the formation of registering cavities 39, 40 in the two portions of the disc for the purpose of reducing its weight.

Although the invention has been described primarily with reference to its application to throttle valves for aero engine carburetors, it will be understood that it is in nowise limited to this particular application but may be applied to butterfly throttle valves generally and consequently has many applications.

What I claim as my invention and desire to secure by Letters Patent is:

1. A butterfly throttle valve, which is constituted by a disc of approximately elliptical cross section arranged to pivot about a central axis at right angles to the elliptical section and to extend obliquely across a conduit to close it, the elliptical section of the disc being thickened on that side which is to face downstream in service to form a bulge, the edge of which, viewed in section in the closed position of the valve, extends downstream from the point at which the leading edge of the central plane of the disc meets the wall of the conduit in a direction substantially parallel to the direction of flow and then turns inward to merge with the downstream face of the disc, the change of direction occurring at a point somewhat on the upstream side of the pivotal axis of the disc.

2. A butterfly throttle valve, which is constituted by a disc of approximately elliptical cross section arranged to pivot about a central axis at right angles to the elliptical section and to extend obliquely across a conduit to close it, the elliptical section of the disc being thickened on that side which is to face downstream in service to form a bulge, the edge of which, viewed in section in the closed position of the valve, extends downstream from the point at which the leading edge of the central plane of the disc meets the wall of the conduit in a direction substantially parallel to the direction of flow and then turns inward to merge with the downstream face of the disc, the change of direction occurring at a point in the plane through the pivotal axis of the disc at right angles to the axis of the conduit.

3. A butterfly throttle valve, which is constituted by a disc of approximately elliptical cross section arranged to pivot about a central axis at right angles to the elliptical section and to extend obliquely across a conduit to close it, the elliptical section of the disc being thickened on that side which is to face downstream in service to form a bulge, the edge of which, viewed in section in the closed position of the valve, extends downstream from the point at which the leading edge of the central plane of the disc meets the wall of the conduit in a direction substantially parallel to the direction of flow and then turns inward to merge with the downstream face of the disc, the change of direction occurring at a point somewhat on the upstream side of the pivotal axis of the disc, and the disc being formed with a concave depression near its trailing edge on the upstream side.

4. A butterfly throttle valve, which is constituted by a disc of approximately elliptical cross section arranged to pivot about a central axis at right angles to the elliptical section and to extend obliquely across a conduit to close it, the elliptical section of the disc being thickened on that side which is to face downstream in service to form a bulge, the edge of which, viewed in section in the closed position of the valve, extends downstream from the point at which the leading edge of the central plane of the disc meets the wall of the conduit in a direction substantially parallel to the direction of flow and then turns inward to merge with the downstream face of the disc, the change of direction occurring at a point in the plane through the pivotal axis of the disc at right angles to the conduit wall, and the disc being formed with a concave depression near its trailing edge on the upstream side.

5. A butterfly throttle valve, which is constituted by a disc of approximately elliptical cross section arranged to pivot about a central axis at right angles to the elliptical section and to extend obliquely across a conduit to close it, the elliptical section of the disc being thickened on that side which is to face downstream in service to form a bulge, the edge of which, viewed in section in the closed position of the valve, extends downstream from the point at which the leading edge of the central plane of the disc meets the wall of the conduit in a direction substantially parallel to the direction of flow and then turns inward to merge with the downstream face of the disc, the change of direction occurring at a point in the plane through the pivotal axis of the disc perpendicular to the conduit wall, the disc being formed with a concave depression near its trailing edge on the upstream side, and the extreme trailing edge of the disc, on the upstream side, which constitutes the outer portion of said concave depression, being swept away from the central plane of the disc.

6. A butterfly throttle valve as claimed in claim 5, in which the portion of the trailing edge of the disc on the downstream side thereof is curved to extend approximately parallel with the upstream side of said trailing edge.

7. A butterfly throttle valve as claimed in claim 4, in which the leading edge of the disc is rounded off on the upstream side.

8. A butterfly throttle valve, which is constituted by a disc of approximately elliptical cross section arranged to pivot about a central axis at right angles to the elliptical section and to extend obliquely across a conduit to close it, the elliptical section of the disc being thickened on that side which is to face downstream in service to form a bulge, the edge of which, viewed in section in the closed position of the valve, extends downstream from the point at which the leading edge of the central plane of the disc meets the wall of the conduit in a direction substantially parallel to the direction of flow and then turns inward to merge with the downstream face of the disc, the change of direction occurring at a point somewhat on the upstream side of the pivotal axis of the disc, the disc having a transverse passage for a supplementary supply of fuel for slow running, and the trailing edge of the disc being arranged to expose a larger area of the conduit than the leading edge as the valve is opened.

9. A butterfly throttle valve, which is constituted by a disc of approximately elliptical cross section arranged to pivot about a central axis at right angles to the elliptical section and to extend obliquely across a conduit to close it, the elliptical section of the disc being thickened on that side which is to face downstream in service to form a bulge, the edge of which, viewed in section in the closed position of the valve, extends downstream from the point at which the leading edge of the central plane of the disc meets the wall of the conduit in a direction substantially parallel to the direction of flow and then turns inward to merge with the downstream face of the disc, the change of direction occurring at a point in the plane through the pivotal axis of the disc perpendicular to the conduit wall, the disc having a transverse passage for a supplementary supply of fuel for slow running, and the trailing edge of the disc being arranged to expose a larger area of the conduit than the leading edge as the valve is opened.

10. A butterfly throttle valve, which is constituted by a disc of approximately elliptical cross section arranged to pivot about a central axis at right angles to the elliptical section and to extend obliquely across a conduit to close it, the elliptical section of the disc being thickened on that side which is to face downstream in service to form a bulge, the edge of which, viewed in section in the closed position of the valve, extends downstream from the point at which the leading edge of the central plane of the disc meets the wall of the conduit in a direction substantially parallel to the direction of flow and then turns inward to merge with the downstream face of the disc.

11. A butterfly throttle valve, which is constituted by a disc of approximately elliptical cross section arranged to pivot about a central axis at right angles to the elliptical section and to extend obliquely across a conduit to close it, the elliptical section of the disc being thickened on that side which is to face downstream in service to form a bulge, the edge of which, viewed in section in the closed position of the valve, extends downstream from the point at which the leading edge of the central plane of the disc meets the wall of the conduit in a direction substantially parallel to the direction of flow and then turns inward to merge with the downstream face of the disc, the change of direction occurring at a point within the range defined as including the plane through the pivotal axis of the disc perpendicular to the conduit wall and other points on the upstream side only of said axis.

12. A butterfly throttle valve which comprises a conduit and a disc arranged to pivot about a central axis and to extend obliquely across the conduit to close it, said disc formed with a bulge on its downstream side at and forming it leading edge, the said leading edge shaped in part to conform with the wall of the conduit when the valve is closed and being curved on the downstream side toward the pivot axis to merge with the downstream face of the disc, that portion of the leading edge of the bulge which conforms with the conduit wall in the closed position of the valve being entirely on the upstream side of the plane passing through the axis of the disc perpendicular to the conduit wall.

EDWARD DODSON.